US010790504B2

(12) United States Patent
Lee et al.

(10) Patent No.: US 10,790,504 B2
(45) Date of Patent: Sep. 29, 2020

(54) COMPOSITE CATHODE ACTIVE MATERIAL FOR LITHIUM ION BATTERY, MANUFACTURING METHOD THEREFOR, AND LITHIUM ION BATTERY CONTAINING CATHODE COMPRISING SAME

(71) Applicant: Samsung SDI Co., Ltd., Yongin-si, Gyeonggi-do (KR)

(72) Inventors: Jaeho Lee, Yongin-si (KR); Seonyoung Kwon, Yongin-si (KR); Kihyun Kim, Yongin-si (KR); Yumi Song, Yongin-si (KR); Kwanghwan Cho, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 32 days.

(21) Appl. No.: 16/326,894

(22) PCT Filed: Aug. 22, 2017

(86) PCT No.: PCT/KR2017/009138
§ 371 (c)(1),
(2) Date: Feb. 20, 2019

(87) PCT Pub. No.: WO2018/038501
PCT Pub. Date: Mar. 1, 2018

(65) Prior Publication Data
US 2019/0190019 A1    Jun. 20, 2019

(30) Foreign Application Priority Data

Aug. 26, 2016    (KR) .................. 10-2016-0109541

(51) Int. Cl.
*H01M 4/02* (2006.01)
*H01M 4/36* (2006.01)
(Continued)

(52) U.S. Cl.
CPC ............ *H01M 4/366* (2013.01); *C01G 53/00* (2013.01); *H01M 4/36* (2013.01); *H01M 4/505* (2013.01);
(Continued)

(58) Field of Classification Search
CPC ...................................................... H01M 4/02
See application file for complete search history.

(56) References Cited

U.S. PATENT DOCUMENTS 8,187,747 B2    5/2012   Abe et al.
9,299,984 B2    3/2016   Jito et al.
(Continued)

FOREIGN PATENT DOCUMENTS

JP    2007-273108 A    10/2007
JP    2011-159619 A    8/2011
(Continued)

OTHER PUBLICATIONS

Written Opinion for International Application No. PCT/KR2017/009138, dated Nov. 30, 2017, 7pp.
(Continued)

*Primary Examiner* — Jacob B Marks
(74) *Attorney, Agent, or Firm* — Lewis Roca Rothgerber Christie LLP

(57) ABSTRACT

Provided are a composite cathode active material for a lithium ion battery including a nickel-rich lithium nickel-based compound having a nickel content of 50 to 100 mol % based on a total content of transition metals; and a coating film including a rare earth metal hydroxide and disposed on the surface of the nickel-rich lithium nickel-based compound, a manufacturing method therefor, and a lithium ion battery including a cathode including the composite cathode active material.

12 Claims, 5 Drawing Sheets

(51) Int. Cl.
  *H01M 4/525* (2010.01)
  *H01M 10/0525* (2010.01)
  *C01G 53/00* (2006.01)
  *H01M 4/505* (2010.01)
  *H01M 4/62* (2006.01)
(52) U.S. Cl.
  CPC .............. *H01M 4/525* (2013.01); *H01M 4/62* (2013.01); *H01M 10/0525* (2013.01); *H01M 2004/028* (2013.01); *Y02E 60/122* (2013.01); *Y02T 10/7011* (2013.01)

(56) References Cited

U.S. PATENT DOCUMENTS

| | | | |
|---|---|---|---|
| 9,799,878 B2 | 10/2017 | Kang et al. | |
| 9,799,879 B2 | 10/2017 | Yang et al. | |
| 10,218,000 B2 | 2/2019 | Kawakita et al. | |
| 2012/0040247 A1 | 2/2012 | Manivannan et al. | |
| 2012/0156565 A1 | 6/2012 | Kim et al. | |
| 2013/0330628 A1 | 12/2013 | Hasegawa et al. | |
| 2016/0043389 A1* | 2/2016 | Deguchi | H01M 4/366 429/200 |
| 2016/0049646 A1 | 2/2016 | Fujiki et al. | |

FOREIGN PATENT DOCUMENTS

| | | |
|---|---|---|
| JP | 2015-130340 A | 7/2015 |
| KR | 10-2011-0081079 A | 7/2011 |
| KR | 10-2014-0007743 A | 1/2014 |
| KR | 10-2014-0081663 A | 7/2014 |
| KR | 10-2015-0080199 A | 7/2015 |
| KR | 10-2016-0091172 A | 8/2016 |
| WO | 2012/099265 A1 | 7/2012 |
| WO | 2015/125444 A1 | 8/2015 |

OTHER PUBLICATIONS

International Search Report for International Application No. PCT/KR2017/009138, dated Nov. 30, 2017, 5pp.
EPO Extended Search Report dated Dec. 18, 2019, for corresponding European Patent Application No. 17843921.2 (6 pages).
Japanese Office Action dated Feb. 10, 2020, for corresponding Japanese Patent Application No. 2019-511379 (6 pages).

* cited by examiner

COMPOSITE CATHODE ACTIVE MATERIAL FOR LITHIUM ION BATTERY, MANUFACTURING METHOD THEREFOR, AND LITHIUM ION BATTERY CONTAINING CATHODE COMPRISING SAME

CROSS-REFERENCE TO RELATED APPLICATION(S)

This application is a National Phase Patent Application of International Patent Application Number PCT/KR2017/009138, filed on Aug. 22, 2017, which claims priority of Korean Patent Application No. 10-2016-0109541, filed Aug. 26, 2016. The entire contents of both of which are incorporated herein by reference.

TECHNICAL FIELD

The present disclosure relates to a composite cathode active material for a lithium ion battery, a manufacturing method therefor, and a lithium ion battery containing a cathode including the same.

BACKGROUND ART

Lithium ion batteries with high voltage and high energy density have been used in a variety of applications. For example, in the case of being used in the fields of electric vehicles (hybrid electric vehicles (HEVs) and plug-in hybrid electric vehicles (PHEVs)), lithium ion batteries need to operate at high temperature, store and release a large content of electricity, and be used for a long time. Thus, the lithium ion batteries need to have a high discharge capacity and improved and lifespan characteristics.

Among cathode active materials, $LiCoO_2$ has been most widely used due to improved lifespan characteristics and high charging and discharging efficiency. However, $LiCoO_2$ has a low capacity and is expensive due to limited reserves of cobalt used as a raw material thereof, and thus $LiCoO_2$ has limitations in price competitiveness to be used in large quantities as a power source of large and medium-sized batteries used in electric vehicles and the like. Lithium manganese oxides such as $LiMnO_2$ and $LiMn_2O_4$ are inexpensive due to abundant reserves of manganese used as a raw material, are eco-friendly, and have improved thermal stability. However, lithium manganese has problems such as a low capacity, poor high temperature characteristics, and poor cycle characteristics. To overcome these shortcomings, the demand for nickel-rich cathode active materials as cathode active materials has increased. However, while the nickel-rich cathode active materials have a high capacity, there may be problems such as a swelling phenomenon caused by a high content of unreacted lithium and gas generation caused by reactions with an electrolytic solution despite the increase in the demand therefor. Although a water cleaning process is generally introduced to remove the unreacted lithium, the surface of a cathode active material is damaged during the water cleaning process, causing another problem such as decrease in capacity, deterioration in high rate characteristics, and increase in resistance during high temperature storage.

DESCRIPTION OF EMBODIMENTS

Technical Problem

Provided is a composite cathode active material for a lithium ion battery having a reduced content of residual lithium and a method of manufacturing the same.

Provided is a lithium ion battery including a cathode including the composite cathode active material and having improved lifespan characteristics and improved high temperature storage characteristics.

Solution to Problem

According to an aspect of the present disclosure,
a composite cathode active material for a lithium ion battery includes:
a nickel-rich lithium nickel-based compound having a nickel content of 50 to 100 mol % based on a total content of transition metals; and
a coating film including a rare earth metal hydroxide and disposed on the surface of the nickel-rich lithium nickel-based compound.

The composite cathode active material may have a specific surface area of 1.2 to 1.8 $m^2/g$.

According to another aspect of the present disclosure,
a method of manufacturing the composite cathode active material for a lithium ion battery includes:
preparing a nickel-rich lithium nickel-based compound by heat-treating a transition metal hydroxide as a precursor of the nickel-rich lithium nickel-based compound having a nickel content of 50 to 100 mol % based on a total content of transition metals and a lithium precursor, in an oxidizing atmosphere;
performing a cleaning process by adding a cleaning solution including a rare earth metal-containing salt and water to the nickel-rich lithium nickel-based compound and stirring the mixture; and
drying a resultant product having gone through the cleaning process.

According to another aspect of the present disclosure,
a lithium ion battery includes a cathode including the above-described composite cathode active material.

Advantageous Effects of Disclosure

A composite cathode active material according to an embodiment has a reduced content of residual lithium and an increased specific surface area, and thus a lithium ion battery having a high capacity, a long lifespan, and improved high temperature storage characteristics may be manufactured by using a cathode including the composite cathode active material.

MODE OF DISCLOSURE

Figure 1:
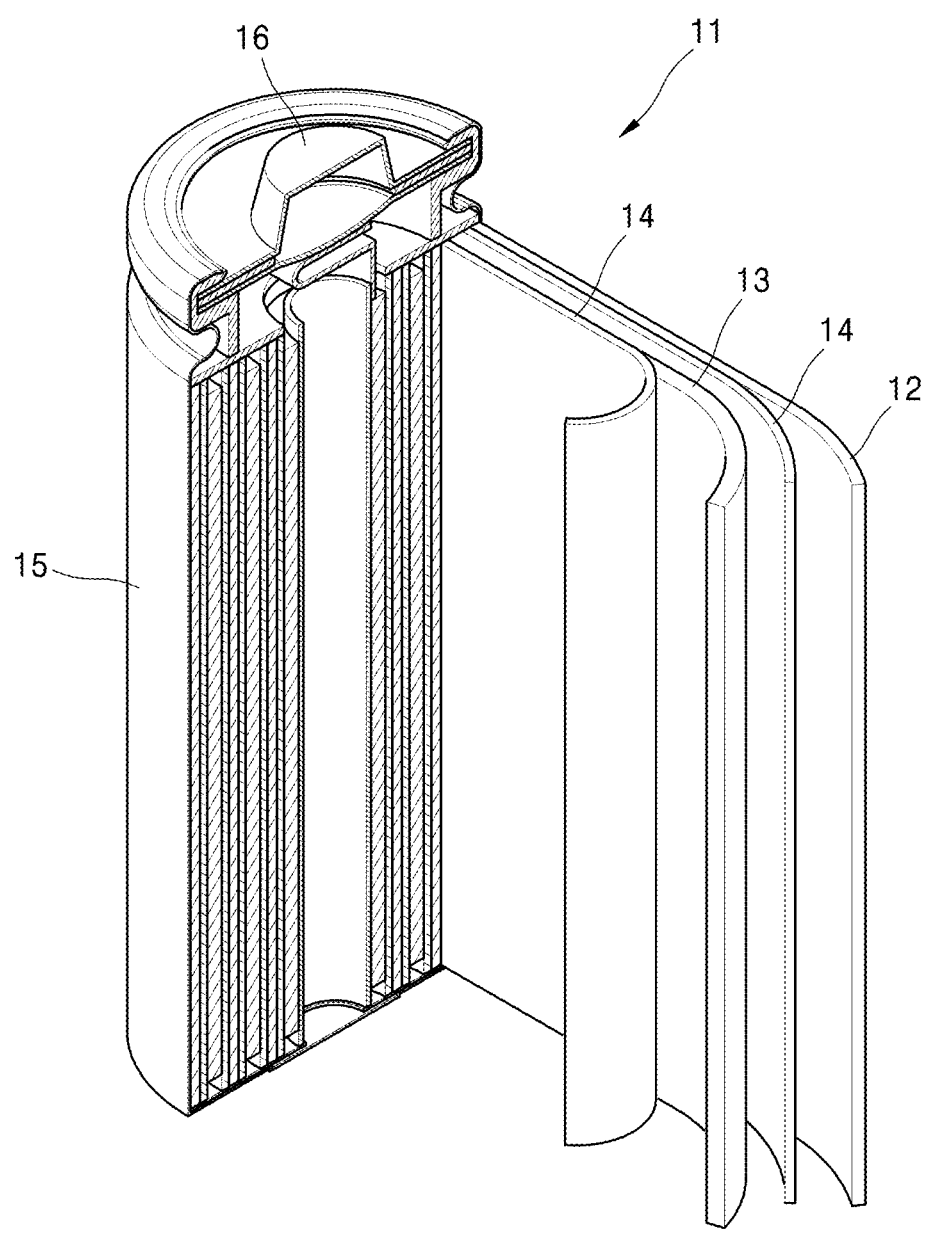
FIG. 1 is a schematic diagram of a lithium secondary battery according to an embodiment.

Hereinafter, a composite cathode active material for a lithium ion battery, a manufacturing method therefor, and a lithium ion battery including a cathode including the composite cathode active material according to exemplary embodiments of the present disclosure will be described in detail.

A composite cathode active material according to an embodiment includes a lithium nickel-based compound having a nickel content of 50 to 100 mol % based on a total content of transition metals, and a coating film including a rare earth metal hydroxide and disposed on the surface of the lithium nickel-based compound.

The composite cathode active material according to an embodiment has a specific surface area of 1.2 to 1.8 m$^2$/g which is higher than specific surface areas of cathode active materials commonly used in the art.

General nickel-rich cathode active materials have a high capacity and improved high rate characteristics and are inexpensive. However, cycle characteristics and stability deteriorate due to residual lithium, such as lithium hydroxide and lithium carbonate, on the surface, and thus improvement thereof is required. A water cleaning process has been known for removing lithium remaining on surfaces of cathode active materials.

However, in the case of performing the water cleaning process as described above, the surface of the water-cleaned cathode active material is excessively exposed as the residual lithium is removed therefrom and a contact area with an electrolytic solution increases, resulting in a decrease in capacity, a deterioration in lifespan characteristics of a lithium ion battery including a cathode using the same, an increase in surface resistance of the cathode active material, and a decrease in high temperature storage characteristics.

Thus, the present inventors provide a composite cathode active material including a rare earth metal hydroxide coating film, which is disposed on the surface of a cathode active material, while minimizing changes of the cathode active material caused by the water cleaning process, by using a cleaning solution including a rare earth metal-containing salt and water during a cleaning process and drying the cleaned cathode active material to solve the above-mentioned problems. A specific surface area of the composite cathode active material is, for example, from 1.3 to 1.6 m$^2$/g, for example, from 1.357 to 1.563 m$^2$/g. By using such a composite cathode active material, a lithium ion battery having improved electrochemical properties and improved high temperature storage characteristics may be manufactured.

Examples of the rare earth metal hydroxide may include, but are not limited to, at least one selected from yttrium hydroxide, cerium hydroxide, lanthanum hydroxide, europium hydroxide, gadolinium hydroxide, scandium hydroxide, and terbium hydroxide.

In the cleaning solution, a content of the rare earth metal-containing salt is from 0.1 to 1.0 M, for example, from 0.2 to 0.5 M. When the content of the rare earth metal-containing salt is within the ranges above, the specific surface area of the composite cathode active material may be adjusted within an appropriate range, and thus a lithium ion battery having improved electrochemical properties and improved high temperature storage characteristics may be manufactured by using the composite cathode active material.

The content of the rare earth metal hydroxide may be from 0.14 to 1.4 parts by weight, for example, from 0.29 to 0.71 parts by weight, based on 100 parts by weight of the lithium nickel-based compound. When the content of the rare earth metal hydroxide is within the ranges above, a lithium ion battery having improved electrochemical properties and improved high temperature storage characteristics may be manufactured.

The nickel-rich lithium nickel-based compound having the nickel content of 50 mol % to 100 mol % may be a compound represented by Formula 1 below.

$$Li_xNi_yM_{1-y}O_2 \quad \text{Formula 1}$$

In Formula 1, $0.9 \leq x \leq 1.2$, $0.5 \leq y < 1.0$, and M includes at least one selected from cobalt (Co), manganese (Mn), and aluminum (Al).

The compound of Formula 1 is, for example, a compound represented by Formula 2 below or a compound represented by Formula 3 below.

$$Li_xNi_yCo_zMn_{1-y-z}O_2 \quad \text{Formula 2}$$

In Formula 2, $1 \leq x \leq 1.2$, $0.5 \leq y < 1$, $0 \leq z \leq 0.5$, and $0 \leq 1-y-z \leq 0.5$.

$$Li_xNi_yCo_zAl_{1-y-z}O_2 \quad \text{Formula 3}$$

In Formula 3, $1 \leq x \leq 1.2$, $0.5 \leq y \leq 1.0$, and $0 \leq z \leq 0.5$.

The content of residual lithium in the composite cathode active material is low as 0.15 wt % or less, for example, 0.11 to 0.13 wt %, based on the total content of the composite cathode active material.

For example, the nickel-rich lithium nickel-based compound may be $LiNi_{0.5}Co_{0.2}Mn_{0.3}O_2$, $LiNi_{0.6}Co_{0.3}Mn_{0.1}O_2$, $LiNi_{0.7}Co_{0.15}Mn_{0.15}O_2$, $LiNi_{0.8}Co_{0.1}Mn_{0.1}O$, $LiNi_{0.6}Co_{0.2}Mn_{0.2}O_2$, $LiNi_{0.88}Co_{0.1}Al_{0.02}O_2$, $LiNi_{0.84}Co_{0.15}Al_{0.01}O_2$, or any mixture thereof.

In the composite cathode active material according to an embodiment, a thickness of the coating film including the rare earth metal hydroxide is 500 nm or less, for example, from 50 to 200 nm. When the thickness of the coating film is within the ranges above, a lithium ion battery having improved electrochemical properties and improved high temperature storage characteristics may be manufactured.

Hereinafter, a method of manufacturing a composite cathode active material according to an embodiment will be described.

First, a transition metal hydroxide that is a precursor of a nickel-rich lithium nickel-based compound having a nickel content of 50 to 100 mol % based on the total content of transition metals and a lithium precursor are heat-treated in an oxidizing atmosphere to prepare the nickel-rich lithium nickel-based compound having a nickel content of 50 to 100 mol % based on the total content of transition metals.

For example, the transition metal hydroxide may be a compound represented by Formula 4 below.

$$Ni_yM_{1-y}OH \quad \text{Formula 4}$$

In Formula 4, y is from 0.5 to 1.0, and M includes at least one selected from cobalt (Co), manganese (Mn), and aluminum (Al).

The compound of Formula 4 is, for example, a compound represented by Formula 5 below or a compound represented by Formula 6 below.

$$Ni_yCo_zMn_{1-y-z}OH \quad \text{Formula 5}$$

In Formula 5, $0.5 \leq y < 1$, $0 \leq z \leq 1.5$, and $0 \leq 1-y-z \leq 0.5$.

$$Ni_yCo_zAl_{1-y-z}OH \quad \text{Formula 6}$$

In Formula 6, y is from 0.5 to 1.0 and z is from 0 to 0.5.

The oxidizing atmosphere refers to oxygen atmosphere or air atmosphere, and the oxygen atmosphere refers to oxygen gas alone or a mixed gas of oxygen an inert gas. As the inert gas, nitrogen, argon, helium, and the like may be used.

The heat treatment may be performed at a temperature of 400 to 1200° C., for example, 500 to 900° C. When the heat treatment is performed at a temperature within the ranges above, a cathode active material having a desired composition may be obtained.

Heat treatment time may vary according to the heat treatment temperature but may be, for example, in a range of 5 minutes to 20 hours.

The transition metal hydroxide may be, for example, $Ni_{0.5}Co_{0.2}Mn_{0.3}OH$, $Ni_{0.6}Co_{0.3}Mn_{0.1}OH$, $Ni_{0.7}Co_{0.15}Mn_{0.15}OH$, $Ni_{0.8}Co_{0.1}Mn_{0.1}OH$, $Ni_{0.6}Co_{0.2}Mn_{0.2}OH$, $Ni_{0.88}Co_{0.1}Al_{0.02}OH$, $Ni_{0.84}Co_{0.15}Al_{0.01}O_2$, or any mixture thereof.

The transition metal hydroxide may be prepared by mixing a transition metal precursor, for example, one selected from a cobalt precursor, a manganese precursor, and an aluminum precursor, with a nickel precursor, followed by coprecipitation, a solid phase method, or the like. The transition metal hydroxide may be prepared according to any method commonly used in the art.

Nickel oxide, nickel acetate, nickel hydroxide, nickel nitrate, or the like may be used as the nickel precursor, and cobalt oxide, cobalt acetate, cobalt hydroxide, cobalt nitrate, or the like may be used as the cobalt precursor. Manganese oxide, manganese acetate, manganese hydroxide, manganese nitrate, or the like may be used as the manganese precursor. In this case, the contents of the nickel precursor and the cobalt precursor are stoichiometrically controlled to obtain a desired transition metal hydroxide.

Although lithium hydroxide (LiOH), lithium carbonate ($Li_2CO_3$), lithium sulfate ($Li_2SO_4$), lithium nitrate ($LiNO_3$), and the like may be used as the lithium precursor, any compounds commonly used in the art may also be used.

The contents of the transition metal hydroxide and the lithium precursor may be stoichiometrically controlled to obtain the nickel-rich lithium nickel-based compound.

Then, a cleaning process is performed by adding a cleaning solution including a rare earth metal-containing salt and water to the nickel-rich lithium nickel-based compound prepared according to the above-described process and stirring the mixture. As a result of performing this cleaning process, residual lithium may be removed from the nickel-rich lithium nickel-based compound.

For example, the rare earth metal-containing salt includes at least one selected from rare earth metal acetate, rare earth metal sulfate, rare earth metal chloride, and rare earth metal nitrate. Particularly, the rare earth metal-containing salt may include at least one selected from yttrium acetate, yttrium sulfate, yttrium chloride, yttrium nitrate, cerium acetate, cerium sulfate, cerium chloride, cerium nitrate, lanthanum acetate, lanthanum sulfate, lanthanum chloride, lanthanum nitrate, europium acetate, europium sulfate, europium chloride, europium nitrate, gadolinium acetate, gadolinium sulfate, gadolinium chloride, gadolinium nitrate, scandium acetate, scandium sulfate, scandium chloride, scandium nitrate, terbium acetate, terbium sulfate, terbium chloride, and terbium nitrate.

According to an embodiment, the use of rare earth metal acetate such as yttrium acetate, cerium acetate, lanthanum acetate, europium acetate, gadolinium acetate, scandium acetate, and terbium acetate as the rare earth metal-containing salt may reduce the content of residual lithium in a finally produced composite cathode active material and appropriately control the specific surface area, thereby manufacturing a lithium ion battery having improved electrochemical properties and improved high temperature storage characteristics.

A product having gone through the above-described cleaning process is dried. In this case, the drying may be performed at a temperature of, for example, 200° C. or less, specifically, in a range of 120 to 150° C. When the drying is performed at a temperature within the ranges above, a composite cathode active material having improved electrochemical properties and improved high temperature storage characteristics may be prepared.

A cathode having a cathode active material layer including the composite cathode active material according to an embodiment may be prepared according to the following process.

A cathode is prepared according to the following method.

A cathode active material composition in which a composite cathode active material, a binder, and a solvent are mixed is prepared.

A conductive agent may further be added to the cathode active material composition.

The cathode active material composition is directly coated on a metallic current collector and dried to prepare a cathode plate. Alternatively, the cathode active material composition may be cast on a separate support, and then a film separated from the support is laminated on the metallic current collector to prepare a cathode plate.

In the preparation of the cathode, a first cathode active material that is a cathode active material commonly used in the art in lithium ion batteries may further be used in addition to the above-described composite cathode active material.

The first cathode active material may further include at least one selected from lithium cobalt oxide, lithium nickel cobalt manganese oxide, lithium nickel cobalt aluminum oxide, lithium iron phosphate, and lithium manganese oxide, without being limited thereto, and any cathode active material commonly used in the art may also be used.

For example, a compound represented by any one of the formulae: $Li_aA_{1-b}B_bD_2$ (where $0.90 \leq a \leq 1.8$ and $0 \leq b \leq 0.5$); $Li_aE_{1-b}B_bO_{2-c}D_c$ (where $0.90 \leq a \leq 1.8$, $0 \leq b \leq 0.5$, and $0 \leq c \leq 0.05$); $LiE_{2-b}B_bO_{4-c}D_c$ (where $0 \leq b \leq 0.5$ and $0 \leq c \leq 0.05$); $Li_aNi_{1-b-c}Co_bB_cD_\alpha$ (where $0.90 \leq a \leq 1.8$, $0 \leq b \leq 0.5$, $0 \leq c \leq 1.05$, and $0 < \alpha \leq 2$); $Li_aNi_{1-b-c}Co_bB_cO_{2-\alpha}F_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bB_cD_\alpha$ (where $0.90 \leq a \leq 1.8$, $0 \leq 1.8$, $0 \leq b \leq 0.5$, $0 \leq c \leq 0.05$, and $0 < \alpha < 2$); $Li_aNi_{1-b-c}Mn_bB_cO_{2-\alpha}F_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bB_cO_{2-\alpha}F_2$ (where $0.90 \leq a \leq 1.8$, $0 \leq b \leq 0.5$, $0 \leq c \leq 0.05$, and $0 < \alpha < 2$); $Li_aNi_bE_cG_dO_2$ (where $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$ and $0.001 \leq b \leq 0.1$); $Li_aCoG_bO_2$ (where $0.90 \leq a \leq 1.8$ and $0.001 \leq b \leq 0.1$); $Li_aMnG_bO_2$ (where $0.90 \leq a \leq 1.8$ and $0.001 \leq b \leq 0.1$); $Li_aMn_2G_bO_4$ (where $0.90 \leq a \leq 1.8$ and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$, may be used.

In the formulae above, A is Ni, Co, Mn, or any combination thereof; B is Al, Ni, Co, Mn, Cr, Fe, Mg, Sr, V, a rare earth element, or any combination thereof; D is O, F, S, P, or any combination thereof; E is Co, Mn, or any combination thereof; F is F, S, P, or any combination thereof; G is Al, Cr, Mn, Fe, Mg, La, Ce, Sr, V, or any combination thereof; Q is Ti, Mo, Mn, or any combination thereof; I is Cr, V, Fe, Sc, Y, or any combination thereof; and J is V, Cr, Mn, Co, Ni, Cu, or any combination thereof.

In the cathode active material composition, the binder may be polyamideimide, polyacrylic acid (PAA), polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, lithium polyacrylate, lithium polymethacrylate, ethylene-propylene diene monomer (EPDM), sulfonated EPDM, styrene butadiene rubber, fluoride rubber, and various copolymers, or the like.

The conductive agent may include, for example, at least one carbonaceous material selected from carbon black, carbon fiber, and graphite. The carbon black may be, for example, one selected from acetylene black, ketjen black, super-P, channel black, furnace black, lamp black, and thermal black. The graphite may be natural graphite or artificial graphite.

The solvent may be butanol, acetonitrile, acetone, methanol, ethanol, N-methyl-2-pyrrolidone (NMP), or the like. However, any other solvent commonly used in the art may also be used.

Meanwhile, a plasticizer may further be added to the cathode active material composition and/or an anode active material composition to form pores in an electrode plate.

Contents of the cathode active material, the conductive agent, the binder, and the solvent are the same as those commonly used in lithium ion batteries. At least one of the conductive agent, the binder, and the solvent may be omitted in accordance with a purpose and a structure of a lithium ion battery.

An anode may be prepared using a method similar to the method used to prepare the cathode, except that an anode active material is used instead of the cathode active material in the preparation of the cathode described above.

The anode active material may be a carbonaceous material, silicon, a silicon oxide, a silicon alloy, a silicon-carbon composite, tin, a tin alloy, a tin-carbon composite, a metal oxide, or any combination thereof.

The carbonaceous material may be crystalline carbon, amorphous carbon, or any mixture thereof. The crystalline carbon may be graphite such as natural graphite or artificial graphite in an amorphous, plate, flake, spherical, or fibrous form. The amorphous carbon may be soft carbon (carbon calcined at low temperature), hard carbon, mesophase pitch carbide, calcined coke, graphene, carbon black, fullerene soot, carbon nanotube, and carbon fiber. However, the amorphous carbon is not limited thereto, and any amorphous carbon available in the art may also be used.

The anode active material may be selected from Si, $SiO_x$ (0<x<2, e.g., from 0.5 to 1.5), Sn, $SnO_2$, a silicon-containing metal alloy, and any mixture thereof. A metal forming an alloy with silicon may include at least one selected from Al, Sn, Ag, Fe, Bi, Mg, Zn, In, Ge, Pb, and Ti.

The anode active material may include a metal/metalloid alloyable with lithium, or an alloy or an oxide thereof. For example, the metal/metalloid alloyable with lithium may include Si, Sn, Al, Ge, Pb, Bi, Sb, an Si—Y alloy (where the Y is an alkali metal, an alkali earth metal, a Group 13 element, a Group 14 element, a transition metal, a rare earth element, or any combination thereof (except for Si)), an Sn—Y alloy (where the Y is an alkali metal, an alkali earth metal, a Group 13 elements, a Group 14 element, a transition metal, a rare earth element, or any combination thereof (except for Sn), $MnO_x$ (0<x≤2), or the like. The element Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or any combination thereof. For example, the oxide of the metal/metalloid alloyable with lithium may be lithium titanium oxide, vanadium oxide, lithium vanadium oxide, $SnO_2$, $SiO_x$ (0<x<2), or the like.

For example, the anode active material may include at least one of the elements belonging Groups 13, 14, and 15 of the periodic table of elements.

For example, the anode active material may include at least one element selected from Si, Ge, and Sn.

In the anode active material composition, a conductive agent, a binder, and a solvent may be the same as those of the cathode active material composition. The contents of the anode active material, the conductive agent, the binder, and the solvent are the same as those commonly used in lithium batteries.

A separator is interposed between the cathode and the anode and an insulating thin film having high ion permeability and high mechanical strength may be used therefor.

A pore diameter of the separator is generally from 0.01 to 10 μm, and a thickness thereof is generally from 5 to 20 μm. As the separator, for example, an olefin-based polymer such as polypropylene; or glass fiber, polyethylene, or the like in the form of a sheet or a nonwoven fabric is used. When a solid polymeric electrolyte is used as an electrolyte, the solid polymeric electrolyte may also serve as a separator.

Among the separators, examples of the olefin-based polymer include polyethylene, polypropylene, polyvinylidene fluoride, or a multilayer film of two or more thereof. The separator may be a mixed multilayer film such as a polyethylene/polypropylene double-layered separator, a polyethylene/polypropylene/polyethylene triple-layered separator, a polypropylene/polyethylene/polypropylene triple-layered separator.

A lithium salt-containing non-aqueous electrolyte is composed of a non-aqueous electrolyte solution and lithium.

As the non-aqueous electrolyte, a non-aqueous electrolyte solution, an organic solid electrolyte, or an inorganic solid electrolyte may be used.

The non-aqueous electrolyte includes an organic solvent. The organic solvent may be any organic solvent commonly used in the art. For example, the organic solvent may be propylenecarbonate, ethylenecarbonate, fluoroethylenecarbonate, butylenecarbonate, di methylcarbonate, diethylcarbonate, methylethylcarbonate, methyl propylcarbonate, ethyl propylcarbonate, methyl isopropylcarbonate, dipropylcarbonate, dibutylcarbonate, fluoroethylenecarbonate, benzonitrile, acetonitrile, tetrahydrofuran, 2-methyltetrahydrofuran, γ-butyrolactone, dioxorane, 4-methyldioxorane, N,N-dimethylformamide, N,N-dimethylacetamide, dimethylsulfoxide, dioxane, 1,2-dimethoxyethane, sulforane, dichloroethane, chlorobenzene, nitrobenzene, diethyleneglycol, dimethylether, or any mixture thereof.

Examples of the organic solid electrolyte may include polyethylene derivatives, polyethylene oxide derivatives, polypropylene oxide derivatives, phosphoric acid ester polymers, polyester sulfide, polyvinyl alcohol, polyvinylidene fluoride, and the like.

Examples of the inorganic solid electrolyte may include $Li_3N$, LiI, $Li_5NI_2$, $Li_3N$—LiI—LiOH, $Li_2SiS_3$, $Li_4SiO_4$, $Li_4SiO_4$—LiI—LiOH, $Li_3PO_4$—$Li_2S$—$SiS_2$, and the like.

The lithium salt may be any lithium salt easily dissolved in the non-aqueous electrolyte, such as $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are each independently natural numbers), LiCl, LiI, or any mixture thereof. In addition, for example, pyridine, triethylphosphite, triethanolamine, cyclic ether, ethylene diamine, n-glyme, hexamethyl phosphoramide, nitrobenzene derivatives, sulfur, quinone imine dye, N-substituted oxazolidinone, N,N-subsituted imidazolidine, ethyleneglycol dialkyl ether, ammonium salt, pyrrole, 2-methoxyethanol, aluminum trichloride, and the like may further be added to the non-aqueous electrolyte to improve charging and discharging characteristics, flame retardancy, and the like. In some cases, a halogen-containing solvent such as carbon tetrachloride and ethylene trifluoride may further be added thereto to provide nonflammability.

As shown in FIG. 1, a lithium ion battery 11 includes a cathode 13, an anode 12, and a separator 34. The aforementioned cathode 13, the anode 12, and the separator 14 are wound or folded and accommodated in a battery case 15. Then, the battery case 15 is filled with an organic electrolytic solution and sealed with a cap assembly 16, thereby completing the manufacture of the lithium ion battery 11. The battery case may have a cylindrical, rectangular, or thin-film shape.

The separator may be interposed between the cathode and the anode to form a battery assembly. The battery assembly is stacked in a bi-cell structure and impregnated in an organic electrolytic solution, and then the obtained resultant is accommodated in a pouch and sealed, thereby completing the manufacture of a lithium-ion polymer battery.

Also, a plurality of battery assemblies may be stacked to form a battery pack, and the battery pack may be used in any device that requires high capacity and high output. For example, the battery pack may be used in notebook computers, smart phones, and electric vehicles.

Hereinafter, the present disclosure will be described in more detail according to the following examples and comparative examples. However, the following examples are merely presented to exemplify the present disclosure, and the scope of the present disclosure is not limited thereto.

Example 1: Preparation of Composite Cathode Active Material

First, a transition metal hydroxide precursor of $Ni_{0.95}Co_{0.15}(OH)_2$ was prepared according to the following process to prepare $LiNi_{0.84}Co_{0.15}Al_{0.01}O_2$.

0.849 g of aluminum hydroxide and 46.62 g of lithium hydroxide were added to 100 g of $Ni_{0.85}Co_{0.15}(OH)_2$. The mixture was heat-treated in an oxidizing atmosphere at 760° C. to prepare $LiNi_{0.84}Co_{0.15}Al_{0.01}O_2$.

$LiNi_{0.84}Co_{0.15}Al_{0.01}O_2$ was subjected to a cleaning process as follows.

$LiNi_{0.84}Co_{0.15}Al_{0.01}O_2$ was cleaned by adding 0.0043 g of yttrium acetate and 30 ml of water to 30 g of $LiNi_{0.84}Co_{0.15}Al_{0.01}O_2$, and stirring the mixture for about 30 minutes to prepare a composite cathode active material. In the cleaning process, a content of yttrium acetate was about $0.1 \times 10^{-2}$ M based on a total content of the cleaning solution (yttrium acetate and water) used in the cleaning process. The cathode active material has a structure including a core active material ($LiNi_{0.84}Co_{0.15}Al_{0.01}O_2$) and a coating film including yttrium hydroxide disposed on the surface of the core active material. Here, a total content of the cleaning solution denotes a total content of yttrium acetate and water.

Examples 2 to 4: Preparation of Composite Cathode Active Material

Composite cathode active materials were prepared in the same manner as in Example 1, except that the contents of yttrium acetate were about $0.2 \times 10^{-2}$ M, $0.5 \times 10^{-2}$ M, and $1.0 \times 10^{-2}$ M, respectively.

Comparative Example 1: Preparation of Cathode Active Material

A cathode active material was prepared in the same manner as in Example 1, except that the cleaning process of $LiNi_{0.84}Co_{0.15}Al_{0.01}O_2$ was not performed.

Comparative Example 2: Preparation of Cathode Active Material

A cathode active material was prepared in the same manner as in Example 1, except that a $LiNi_{0.84}Co_{0.15}Al_{0.01}O_2$ was cleaned according to the following process.

$LiNi_{0.88}Co_{0.1}Al_{0.02}O_2$ was cleaned by adding 30 ml of water to 30 g of $LiNi_{0.88}Co_{0.1}Al_{0.02}O_2$, and stirring the mixture for about 30 minutes.

Manufacturing Example 1: Preparation of Lithium Ion Battery (Coin Half Cell)

The composite cathode active material prepared according to Example 1, polyvinylidene fluoride, and carbon black as a conductive agent were mixed to prepare a cathode active material-forming slurry. N-methylpyrrolidone, as a solvent, was added to the slurry, and a mixing ratio of the cathode active material, polyvinylidene fluoride, and carbon black was 94:3:3 by weight.

The slurry prepared as described above was coated on an aluminum thin film using a doctor blade to prepare a thin electrode plate, and the thin electrode plate was dried at 135° C. for 3 hours or more, roll-pressed, and vacuum-dried to prepare a cathode.

A 2032 type coin half cell was prepared using the cathode prepared according to Example 1 and lithium metal as a counter electrode. A porous polyethylene (PE) film was interposed between the cathode and the lithium metal counter electrode as a separator (having a thickness of about 16 μm), and an electrolytic solution was injected thereinto to prepare a lithium ion battery.

The electrolytic solution was prepared by dissolving 1.3 M $LiPF_6$ in a mixed solvent of ethylenecarbonate (EC), ethylmethylcarbonate (EMC), and dimethylcarbonate (DMC) mixed in a volume ratio of 3:4:3.

Preparation Examples 2 to 4: Preparation of Lithium Ion Battery (Coin Half Cell)

Lithium ion batteries were prepared in the same manner as in Manufacturing Example 1, except that the composite cathode active materials prepared according to Examples 2 to 4 were used respectively in the preparation of cathodes instead of the composite cathode active material prepared according to Example 1.

Comparative Preparation Examples 1 and 2: Preparation of Lithium Ion Battery (Coin Half Cell)

Lithium ion batteries were prepared in the same manner as in Manufacturing Example 1, except that the cathode active materials prepared according to Comparative Examples 1 and 2 were used respectively in the preparation of cathodes instead of the composite cathode active material prepared according to Example 1.

Evaluation Example 1: Scanning Electron Microscope

The composite cathode active material prepared according to Example 1 and the cathode active materials prepared according to Comparative Examples 1 and 2 were analyzed using a scanning electron microscope. A Sirion 200 manufactured by Philips was used in the scanning electron microscope analysis.

Figure 2A:
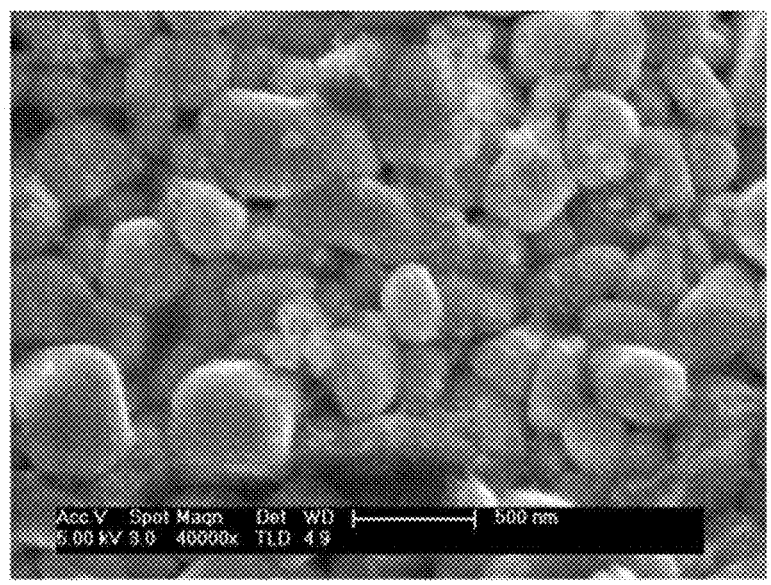
FIGS. 2A to 2C illustrate scanning electron microscope analysis results of a composite cathode active material prepared according to Example 1 and cathode active materials prepared according to Comparative Examples 1 and 2, respectively.
Figure 2B:
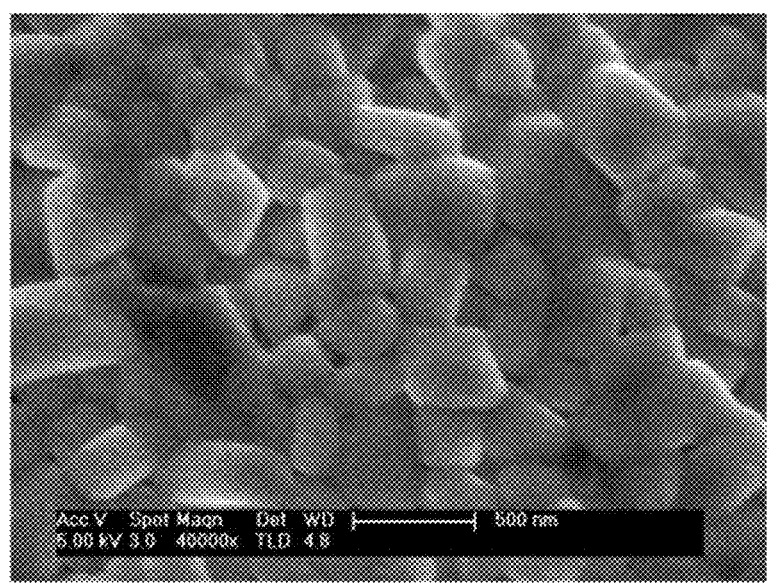
Figure 2C:
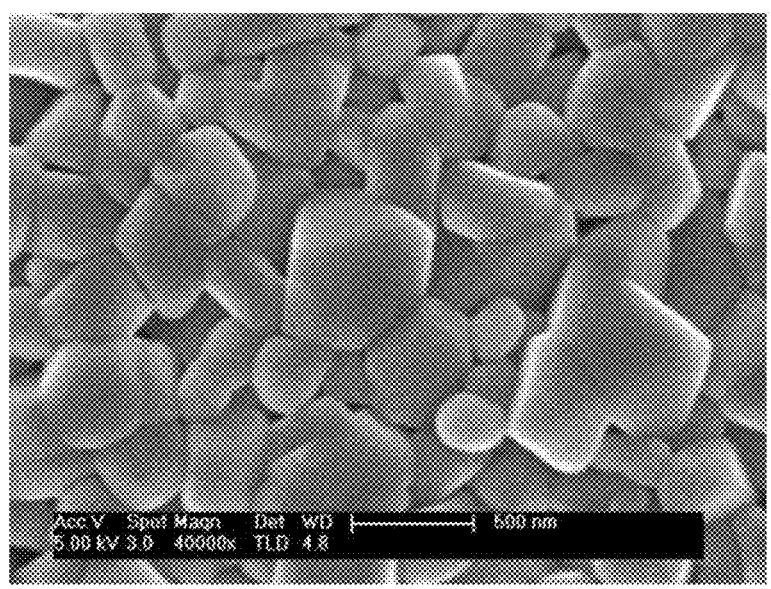

Scanning electron microscope analysis results of the composite cathode active material prepared according to Example 1 and the cathode active materials prepared according to Comparative Examples 1 and 2 are shown in FIGS. 2A to 2C.

As shown in FIG. 2B, black stains were observed on the surface of the cathode active material prepared according to Comparative Example 1 which was not subjected to the cleaning process. These black stains are caused by unreacted lithium compound corresponding to lithium hydroxide and lithium carbonate. FIG. 2C is a scanning electron microscope image of the cathode active material prepared according to Comparative Example 2 having gone through the water cleaning process. Referring to FIG. 2C, it was confirmed that there was almost no stain on the surface of the cathode active material.

On the contrary, it was confirmed that no stain was found on the surface of the composite cathode active material prepared according to Example 1 and a coating film was formed on the surface.

Evaluation Example 2: Specific Surface Area

Specific surface areas of the composite cathode active materials prepared according to Examples 1 to 3 and the cathode active materials prepared according to Comparative Examples 1 and 2 were measured using a BET method, and the results are shown in Table 1 below.

TABLE 1

| Example | Content of yttrium acetate (M) | Specific surface area of cathode active material (m$^2$/g) |
|---|---|---|
| Example 1 | $0.1 \times 10^{-2}$ | 1.563 |
| Example 2 | $0.2 \times 10^{-2}$ | 1.461 |
| Example 3 | $0.5 \times 10^{-2}$ | 1.357 |
| Example 4 | $1.0 \times 10^{-2}$ | 1.531 |
| Comparative Example 1 | — | 0.191 |
| Comparative Example 2 | — | 1.956 |

As shown in Table 1, the cathode active material according to Comparative Example 1 exhibited a low specific surface area due to unreacted lithium hydroxide and lithium carbonate as a unreacted lithium compound existing on the surfaces of particles and between primary particles.

On the contrary, in the composite cathode active materials prepared according to Examples 1 to 4, when the content of yttrium acetate is greater than about $0.5 \times 10^{-2}$ M, the specific surface areas increased again because a large content is coated on the surfaces. As described above, it was confirmed that the composite cathode active materials prepared according to Example 1 to 4 had increased specific surface areas in comparison with the composite cathode active material prepared according to Comparative Example 1.

Because unreacted lithium is removed from the cathode active material according to Comparative Example 2 together with unreacted lithium existing between primary particles by the water cleaning process, the primary particles are exposed. Thus, the cathode active material according to Comparative Example 2 had a higher specific surface area than those of the composite cathode active materials prepared according to Examples 1 to 4. Although the cathode active material according to Comparative Example 2 had an increased specific surface area, the cathode active material was damaged as described above with reference to the other evaluation examples. Thus, it was confirmed that a lithium ion battery including the cathode active material according to Comparative Example 2 had deteriorated battery performance in comparison with the composite cathode active materials according to Examples 1 to 4. That is, it was confirmed that the composite cathode active materials according to Examples 1 to 4 had specific surface area characteristics suitable for lithium ion batteries having improved cell performance based on these results.

Evaluation Example 3: Measurement of Content of Unreacted Lithium (Residual Lithium)

The contents of unreacted lithium included in the composite cathode active materials prepared according to Examples 1 to 4 and the cathode active materials prepared according to Comparative Examples 1 and 2 were measured.

The contents of unreacted lithium were determined by calculating a total content of only Li (TTL, Total Lithium) after measuring contents of compounds including residual Li respectively (for example, LiOH or $Li_2CO_3$) by potentiometric neutralization titration. A calculation method is shown in Equation 1 below.

TTL (Total Li)=LiOH analysis value (%)×Li/LiOH+ $Li_2CO_3$ analysis value (%)×2Li/$Li_2CO_3$=LiOH analysis value (%)×0.29+$Li_2CO_3$ analysis value (%)×0.188       Equation 1

Measurement results of the contents of unreacted lithium are shown in Table 2 below.

TABLE 2

| Example | Content of yttrium acetate ($10^{-2}$ M) | Content of unreacted lithium (wt %) |
|---|---|---|
| Example 1 | 0.1 | 0.11 |
| Example 2 | 0.2 | 0.11 |
| Example 3 | 0.5 | 0.12 |
| Example 4 | 1.0 | 0.13 |
| Comparative Example 1 | — | 0.47 |
| Comparative Example 2 | — | 0.12 |

As shown in Table 2, it was confirmed that there was a high content of unreacted lithium according to Comparative Example 1. In addition, because unreacted lithium was removed from the cathode active material according to Comparative Example 2, a lower content of unreacted lithium was obtained in comparison with the case of Comparative Example 1.

On the contrary, the composite cathode active materials prepared according to Examples 1 to 4 had lower contents of residual lithium than those of the cathode active materials prepared according to Comparative Examples 1 and 2. In addition, it was confirmed that there were little changes in the contents of unreacted lithium although the content of yttrium acetate was changed.

Evaluation Example 4: Transmission Electron Microscopy (TEM) Coupled with Energy Dispersive X-ray Spectroscopy (EDS) (TEM/EDS)

The composite cathode active material prepared according to Example 1 was subjected to a TEM/EDS analysis. In the TEM/EDS analysis, a Tecnai F30 manufactured by FEI company was used.

Figure 3A:
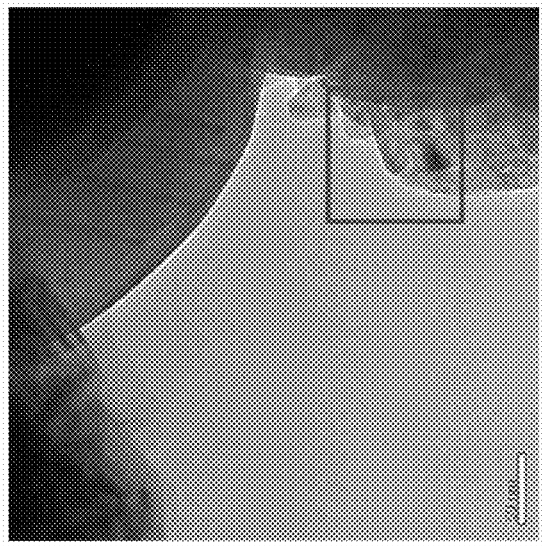
FIG. 3A is a transmission electron microscope (TEM) image of the composite cathode active material prepared according to Example 1.
Figure 3B:
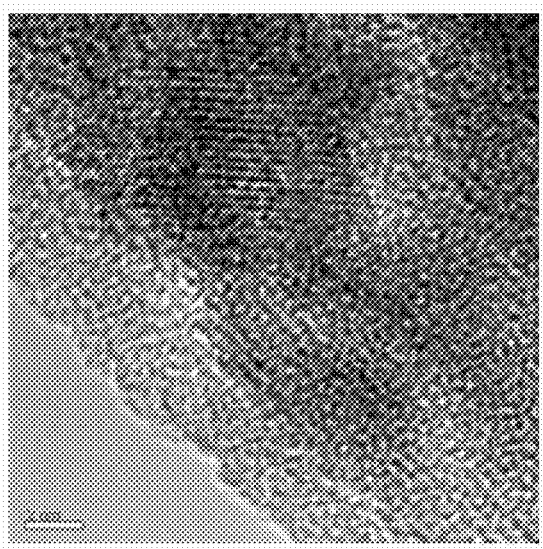
FIG. 3B is an enlarged view of a square area of FIG. 3A.

TEM analysis results are shown in FIGS. 3A and 3B. FIG. 3A is a TEM image and FIG. 3B is an enlarged view of a square area of FIG. 3A.

Referring to FIGS. 3A and 3B, it was difficult to distinguish a phase of yttrium hydroxide because several particles overlap on the surface of the composite cathode active material. Also, as a result of EDS mapping analysis on the square area of FIG. 3A, the presence of yttrium was identified in the square area, i.e., the surface area, of FIG. 3A. Thus, the coating film having yttrium was identified on the surface of the composite cathode active material prepared according to Example 1.

Evaluation Example 5: High Temperature Storage Characteristics

The lithium ion batteries prepared according to Preparation Examples 1 to 4 and Comparative Preparation Examples 1 and 2 were charged at a constant current rate of 0.1 C at room temperature (25° C.) until a voltage reached 4.30 V (vs. Li), and then while maintaining the voltage of 4.3 V in a constant voltage mode, the charging process was cut off at a current rate of 0.05 C. Subsequently, the lithium ion batteries were discharged at a constant current rate of 0.1 C until the voltage reached 3.00 V (vs. Li) (Formation, 1$^{st}$ cycle).

The lithium ion batteries having gone through the formation were charged at a constant current rate of 0.5 C at 25° C. until the voltage reached 4.30 V (vs. Li), and then while maintaining the voltage of 4.30 V in a constant voltage mode, the charging process was cut off at a current rate of 0.05 C. Subsequently, the lithium ion batteries were discharged at a current rate of 1.0 C until the voltage reached 3.00 V (vs. Li). Remaining capacity and recovery capacity were calculated based on a discharge value (mAh/g) at this time. Subsequently, the lithium ion batteries were charged at a constant current rate of 0.5 C at 25° C. until the voltage reached 4.30 V (vs. Li), and then while maintaining the voltage of 4.30 V in a constant voltage mode, the charging process was cut off at a current rate of 0.05 C. After charging, resistance before high temperature storage was measured.

The batteries charged to 4.3 V were stored in an oven at 60° C. for 7 days and cooled to room temperature (25° C.). Resistances of the cooled lithium ion batteries after high temperature storage were measured.

Resistance variation between resistance before high temperature storage and resistance measured at room temperature (25° C.) after storage in the oven at 60° C. for 7 days was calculated. Some of the measured resistance variations are shown in Table 3 below. The resistance variation shown in Table 3 indicates a difference between resistance before the high temperature storage and resistance after the high temperature storage.

TABLE 3

| Example | Content of yttrium acetate (10$^{-2}$ M) | Resistance before high temperature storage (Ω) | Resistance after high temperature storage (Ω) | Resistance variation (Ω) |
|---|---|---|---|---|
| Manufacturing Example 1 | 0.1 | 97.3 | 94.2 | −3.1 |
| Manufacturing Example 2 | 0.2 | 92.8 | 87.6 | −5.2 |
| Manufacturing Example 3 | 0.5 | 88.4 | 84.5 | −3.9 |
| Manufacturing Example 4 | 1.0 | 86.8 | 82.8 | −4 |
| Comparative Manufacturing Example 1 | — | 14.5 | 23.7 | +9.2 |
| Comparative Manufacturing Example 2 | — | 213.1 | 237.1 | +24 |

Referring to Table 3, the resistance of the lithium ion battery prepared according to Comparative Manufacturing Example 1 considerably increased after high temperature storage in comparison with the resistance before the high temperature storage. In addition, the lithium ion battery prepared according to Comparative Manufacturing Example 2 had a high resistance because a large area of the surface was exposed by the removal of a large amount of unreacted lithium during the water cleaning process, an increased resistance after the high temperature storage in comparison with the resistance before the high temperature storage.

On the contrary, the resistances of the lithium ion batteries prepared according to Preparation Examples 1 to 4 decreased after the high temperature storage in comparison with the resistances before the high temperature storage. Thus, it was confirmed that the lithium ion batteries prepared according to Preparation Examples 1 to 4 had improved high temperature storage characteristics in comparison with those of Comparative Preparation Examples 1 and 2.

Evaluation Example 6: Charging and Discharging Characteristics (Capacity Retention Ratio)

Charging and discharging characteristics of the lithium ion batteries were evaluated using a charger/discharger according to the following conditions.

The lithium ion batteries prepared according to Preparation Examples 1 to 4 and Comparative Preparation Examples 1 and 2 were charged at a constant current rate of 0.1 C at room temperature (25° C.) until the voltage reached 4.30 V (vs. Li), and then while maintaining the voltage of 4.30 V in a constant voltage mode, the charging process was cut off at a current rate of 0.05 C. Subsequently, the lithium ion batteries were discharged at a constant current of 0.1 C until the voltage reached 3.00 V (vs. Li) (Formation, 1$^{st}$ cycle).

A first cycle of charging and discharging was performed as follows. The cells were charged at a constant current rate of 0.1 C until the voltage reached 4.3 V and charged at a constant voltage until the current reached 0.05 C. The charged cells were rested for about 10 minutes and discharged at a constant current rate of 0.1 C until the voltage reached 3 V. A second cycle of charging and discharging was performed as follows. The cells were charged at a constant current rate of 0.2 C until the voltage reached 4.3 V and charged at a constant voltage until the current reached 0.05 C. The charged cells were rested for about 10 minutes and discharged at a constant current of 0.2 C until the voltage reached 3 V.

Figure 4:
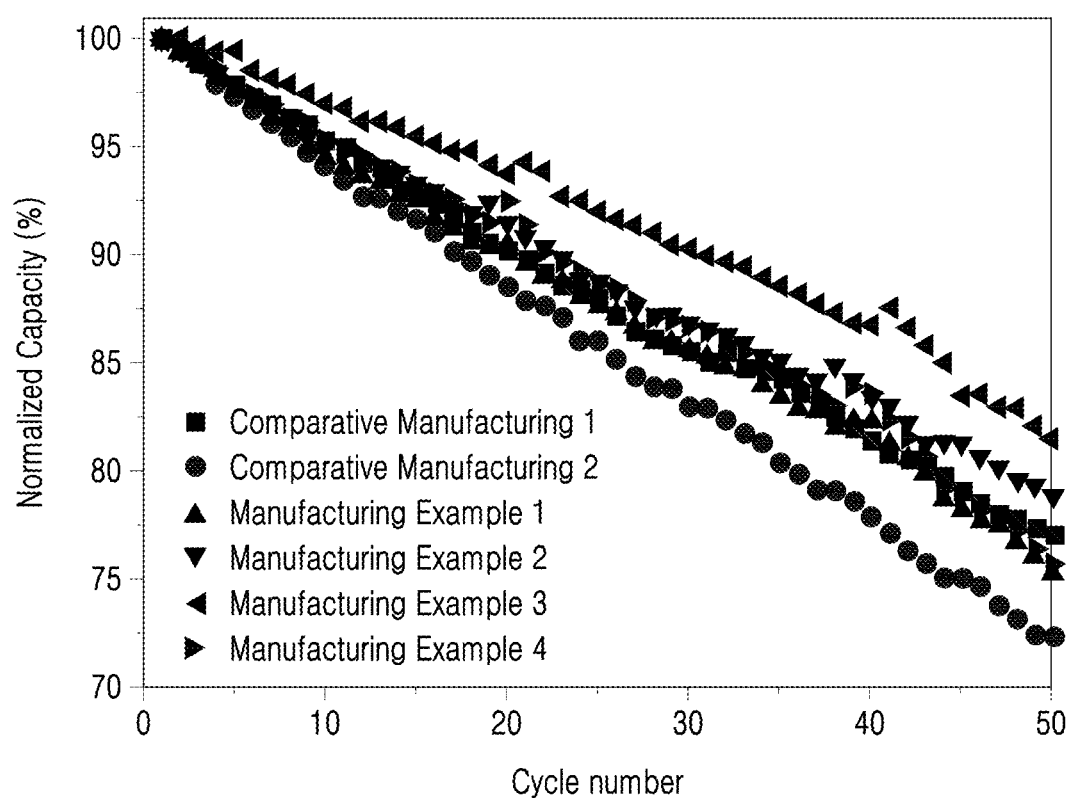
FIG. 4 illustrates charging and discharging characteristics of lithium ion batteries prepared according to Manufacturing Examples 1 to 4 and Comparative Manufacturing Examples 1 and 2.

Lifespan characteristics were evaluated as follows. The cells were charged at a constant current rate of 1 C until the voltage reached 4.3 V and charged at a constant voltage until the current reached 0.05 C. The charged cells were rested for about 10 minutes and discharged at a constant current rate of 1 C until the voltage reached 3 V. This charging and discharging cycle was repeated 50 times. Test results are shown in FIG. 4 and Table 4 below. Capacity retention ratio was calculated using Equation 3 below.

Capacity retention ratio [%]=[discharge capacity at $50^{th}$ cycle/discharge capacity at $1^{st}$ cycle]×100    Equation 3

TABLE 4

| Example | Content of yttrium acetate ($10^{-2}$ M) | 0.2 C capacity (mAh/g) | Capacity retention ratio (%, @1 C/1 C) |
|---|---|---|---|
| Manufacturing Example 1 | 0.1 | 200.6 | |
| Manufacturing Example 2 | 0.2 | 201.6 | 87.6 |
| Manufacturing Example 3 | 0.5 | 200.8 | 84.5 |
| Comparative Manufacturing Example 1 | — | 196.2 | 72.36 |
| Comparative Manufacturing Example 2 | — | 199.3 | 77.13 |

As shown in FIG. 4 and Table 4, while the lithium ion battery prepared according to Comparative Manufacturing Example 1 did not show a big difference in the 0.2 C capacity but had a low capacity retention ratio after performing 50 cycles. In addition, the lithium ion battery prepared according to Comparative Manufacturing Example 2 had an increased resistance due to an increased surface area despite a low content of residual lithium, thereby having a lower capacity retention ratio than that of Comparative Manufacturing Example 1.

On the contrary, the lithium ion batteries prepared according to Preparation Examples 1 to 4 had increased 0.2 C capacities and increased capacity retention ratios in comparison with the lithium ion batteries prepared according to Comparative Preparation Examples 1 and 2. Referring to the results of Table 4, in the case where the concentration of yttrium acetate was about 0.2 to 0.5 M, a higher capacity retention ratio was obtained. When the concentration of yttrium acetate was 0.5 M, the highest capacity retention ratio was obtained.

While one or more exemplary embodiments have been described with reference to the preparation examples and examples, it will be understood by those of ordinary skill in the art that various changes in form and details may be made therein without departing from the spirit and scope as defined by the following claims.

The invention claimed is:

1. A composite cathode active material for a lithium ion battery comprising:
    a nickel-rich lithium nickel-based compound having a nickel content of 50 to 100 mol % based on a total content of transition metals; and
    a coating film comprising a rare earth metal hydroxide and disposed on the surface of the nickel-rich lithium nickel-based compound.

2. The composite cathode active material of claim 1, wherein a specific surface area of the composite cathode active material is from 1.2 to 1.8 m²/g.

3. The composite cathode active material of claim 1, wherein the rare earth metal hydroxide comprises at least one selected from yttrium hydroxide, cerium hydroxide, lanthanum hydroxide, europium hydroxide, gadolinium hydroxide, scandium hydroxide, and terbium hydroxide.

4. The composite cathode active material of claim 1, wherein a content of the rare earth metal hydroxide is in a range of 0.14 to 1.4 parts by weight based on 100 parts by weight of the nickel-rich lithium nickel-based compound.

5. The composite cathode active material of claim 1, wherein the nickel-rich lithium nickel-based compound is a compound represented by Formula 1 below:

$Li_xNi_yM_{1-y}O_2$    Formula 1 wherein in Formula 1, 0.9≤x≤1.2, 0.5≤y≤1.0, and M comprises at least one selected from cobalt (Co), manganese (Mn), and aluminum (Al).

6. The composite cathode active material of claim 5, wherein the compound of Formula 1 is a compound represented by Formula 2 below or a compound represented by Formula 3 below:

$Li_xNi_yCo_zMn_{1-y-z}O_2$    Formula 2 wherein in Formula 2, 1≤x≤1.2, 0.5≤y≤1, 0≤z≤0.5, and 0≤1-y-z≤0.5, $Li_xNi_yCo_zAl_{1-y-z}O_2$    Formula 3 in Formula 3, 1≤x≤1.2, 0.5≤y≤1.0, and 0≤z≤0.5.

7. The composite cathode active material of claim 1, wherein a content of residual lithium in the composite cathode active material is 0.15 wt % or less based on a total content of the composite cathode active material.

8. A method of manufacturing the composite cathode active material for a lithium ion battery according to claim 1, the method comprising:
    preparing a nickel-rich lithium nickel-based compound by heat-treating i) a transition metal hydroxide as a precursor of the nickel-rich lithium nickel-based compound having a nickel content of 50 to 100 mol % based on a total content of transition metals and ii) a lithium precursor, in an oxidizing atmosphere;
    performing a cleaning process by adding a cleaning solution comprising a rare earth metal-containing salt and water to the nickel-rich lithium nickel-based compound and stirring the mixture; and
    drying a resultant product having gone through the cleaning process.

9. The method of claim 8, wherein the rare earth metal-containing salt comprises at least one selected from yttrium acetate, yttrium sulfate, yttrium chloride, yttrium nitrate, cerium acetate, cerium sulfate, cerium chloride, cerium nitrate, lanthanum acetate, lanthanum sulfate, lanthanum chloride, lanthanum nitrate, europium acetate, europium sulfate, europium chloride, europium nitrate, gadolinium acetate, gadolinium sulfate, gadolinium chloride, gadolinium nitrate, scandium acetate, scandium sulfate, scandium chloride, scandium nitrate, terbium acetate, terbium sulfate, terbium chloride, and terbium nitrate.

10. The method of claim 8, wherein in the cleaning solution, a content of the rare earth metal-containing salt is from 0.1 to 1.0 M.

11. The method of claim 8, wherein the drying is performed at a temperature of 200° C. or less.

12. A lithium ion battery comprising a cathode including the composite cathode active material according to claim 1.

* * * * *